United States Patent
Soons et al.

(10) Patent No.: US 12,322,072 B2
(45) Date of Patent: Jun. 3, 2025

(54) METHOD AND APPARATUS FOR NOISE REDUCTION

(71) Applicant: AGFA NV, Mortsel (BE)

(72) Inventors: Joris Soons, Mortsel (BE); Pieter Vuylsteke, Mortsel (BE)

(73) Assignee: Agfa NV, Mortsel (BE)

( * ) Notice: Subject to any disclaimer, the term of this patent is extended or adjusted under 35 U.S.C. 154(b) by 529 days.

(21) Appl. No.: 17/767,597

(22) PCT Filed: Oct. 8, 2020

(86) PCT No.: PCT/EP2020/078231
§ 371 (c)(1),
(2) Date: Apr. 8, 2022

(87) PCT Pub. No.: WO2021/069557
PCT Pub. Date: Apr. 15, 2021

(65) Prior Publication Data
US 2023/0133074 A1 May 4, 2023

(30) Foreign Application Priority Data
Oct. 10, 2019 (EP) .................................. 19202349

(51) Int. Cl.
*G06T 5/70* (2024.01)

(52) U.S. Cl.
CPC ...... *G06T 5/70* (2024.01); *G06T 2207/20012* (2013.01); *G06T 2207/20016* (2013.01);
(Continued)

(58) Field of Classification Search
CPC ............. G06T 5/70; G06T 2207/20012; G06T 2207/20016; G06T 2207/20192; G06T 2207/30004; G06T 5/73
See application file for complete search history.

(56) References Cited

U.S. PATENT DOCUMENTS

| 5,461,655 A * | 10/1995 | Vuylsteke ................. G06T 5/94 345/428 |
| 2002/0071600 A1 | 6/2002 | Yamada |
| 2003/0161517 A1 * | 8/2003 | Vuylsteke ................. G06T 5/92 382/128 |

FOREIGN PATENT DOCUMENTS

| EP | 0574969 A2 | 12/1993 |
| EP | 1933272 A1 | 6/2008 |

OTHER PUBLICATIONS

Burt, "Fast Filter Transforms for Image Processing," *Computer Graphics and Image Processing*, 16: 20-51 (1981).
(Continued)

*Primary Examiner* — Akwasi M Sarpong
*Assistant Examiner* — Michael L Burleson
(74) *Attorney, Agent, or Firm* — Leydig, Voit & Mayer, Ltd.

(57) ABSTRACT

This invention is related to a multi-scale image processing algorithm for enhancing contrast to noise ratio in an electronic representation of an image represented by a) decomposing said digital image into a set of detail images at multiple resolution levels and a residual image at a resolution level lower than said multiple resolution levels, b) processing said detail images, c) computing a processed image by applying a reconstruction algorithm to the residual image and the processed detail images, said reconstruction algorithm being such that if it were applied to the residual image and the detail images without processing, then said digital image or a close approximation thereof would be obtained. The processing comprises the steps of: d) calculating a local variance value for at least one detail image pixel within a neighbourhood of said detail image pixel; e) enhancing or suppressing at least one detail image pixel as a function of said local variance value and said detail image pixel value.

12 Claims, 1 Drawing Sheet

(52) U.S. Cl.
CPC ............... *G06T 2207/20192* (2013.01); *G06T 2207/30004* (2013.01)

(56) References Cited

OTHER PUBLICATIONS

Crowley et al., "Fast Computation of the Difference of Low-Pass Transform," Report No. CMU-RI-TR-82-18, Carnegie-Mellon University, The Robotics Institute, 45 pp. (1982).
Ebrahimi et al., "Image compression by Gabor expansion," *Optical Engineering*, 30(7): 873-880 (1991).
Fong et al., "Comparison study of nonlinear filters in image processing applications," *Optical Engineering*, 28(7): 749-760 (1989).
Lee, "Digital Image Enhancement and Noise Filtering by Use of Local Statistics," *IEEE Transactions on Pattern Analysis and Machine Intelligence*, PAMI-2(2): 165-168 (1980).
Mallat, "A Theory for Multiresolution Signal Decomposition: The Wavelet Representation," *IEEE Transactions on Pattern Analysis and Machine Intelligence*, 11(7): 674-693 (1989).
Mei et al., "Improved multiscale image enhancement via Laplacian pyramid," *Proc. SPIE Second International Conference on Image and Graphics*, 4875: 402-407 (2002).
Park et al., "Edge-preserving artifact-free smoothing with image pyramids," *Pattern Recognition Letters*, 12: 467-475 (1991).
Ranganath, "Image Filtering Using Multiresolution Representations," *IEEE Transactions on Pattern Analysis and Machine Intelligence*, 13(5): 426-440 (1991).
Yang et al., "Adaptive filter for noise removal using wavelet transform," *SPIE Visual Communications and Image Processing*, 2501: 187-197 (1995).
European Patent Office, International Search Report in International Patent Application No. PCT/EP2020/078231, mailed Oct. 29, 2020, 4 pp.
European Patent Office, Written Opinion in International Patent Application No. PCT/EP2020/078231, mailed Oct. 29, 2020, 7 pp.

\* cited by examiner

METHOD AND APPARATUS FOR NOISE REDUCTION

CROSS-REFERENCE TO RELATED APPLICATIONS

This patent application is the U.S. national phase of copending International Patent Application No. PCT/EP2020/078231, filed Oct. 8, 2020, which claims the benefit of European Patent Application No. 19202349.7, filed Oct. 10, 2019.

TECHNICAL FIELD

The present invention relates to a method and a system for enhancing the image quality of an image that is represented by a digital signal by increasing the signal-to-noise ratio of such a digital image.

More in particular it relates to such method for use in a medical radiographic imaging system, such as a computed radiography system.

BACKGROUND OF THE INVENTION

Commonly images represented by a digital signal such as medical images are subjected to image processing during or prior to displaying soft or hard copy recording. The conversion of grey value pixels into values suitable for reproduction or displaying may comprise a multiscale image processing method (also called multi-resolution image processing method) by means of which the contrast of the image is enhanced.

Images obtained from image sensing devices always contain noise to some extent. In the application field of medical X-ray imaging there exists a well-known trade-off between diagnostic image quality and patient dose, due to the presence of noise in the radiation source.

Linear and non-linear filters are widely used in image processing applications to reduce the noise level. Linear filters perform very well in attenuating the noise component, but at the same time this category of filters smear the edges and small structures within the image. In this respect many non-linear filters preserve edges much better, such as described in the paper: Fong Y. S., Pomalaza-Raez C. A., Wang X. H., "Comparison study of non-linear filters in image processing applications", Optical Engineering, vol. 28, no. 7, pp. 749-760, July 1989.

Ideally the filter parameters should be adjusted to the local image statistics. A basic adaptive noise filtering method is described in: Lee J. S., "Digital Image Enhancement and Noise Filtering by use of Local Statistics", IEEE Trans. on Pattern Analysis and Machine Intelligence, vol. 2, no. 2, pp. 165-168, March 1980. Typically, the local variance is used to control the degree of smoothing.

Until recently, research on noise filtering in the spatial domain was focussed on local operators with a fixed size. These kind of filters perform optimally only if the noise spatial spectrum is confined to a narrow band, usually the higher frequency portion of the image spectrum. If the noise band is not very narrow, larger filter sizes must be used, and artefacts are likely to occur in regions of abruptly changing statistics such as in the vicinity of edges. Filters known as 'sigma filter', or 'adaptive mean filter' as they are called in the above comparative study of Wong et al. provide a solution to this problem, but they are computationally expensive.

In the field of digital image processing the concept of multi-resolution computation has been vastly implemented, and is often called pyramidal image processing. According to this concept multiple sets of processing parameters are used, tuned to a wide range of detail sizes. The basic concepts and efficient implementations of pyramidal decomposition are described in: Burt P. J., "Fast Filter Transforms for Image Processing", Computer Graphics and Image Processing, vol. 16, pp. 20-51, 1981; Crowley J. L., Stern R. M., "Fast Computation of the Difference of Low-Pass Transform", IEEE Trans. on Pattern Analysis and Machine Intelligence, vol. 6, no. 2, March 1984, and in U.S. Pat. No. 4,718,104.

Alternative multi-resolution representations are presented in: Mallat S. G., "A Theory for Multiresolution Signal Decomposition: The Wavelet Representation", IEEE Trans. on Pattern Analysis and Machine Intelligence, vol. 11, no. 7, July 1989; Ebrahimi T., Kunt M., "Image compression by Gabor Expansion", Optical Engineering, vol. 30, no. 7, pp. 873-880, July 1991.

Until now the main purpose of these kind of image processing techniques has been directed towards image compression. Other applications include multi-resolution image segmentation, image contrast enhancement, image interpolation, and filter synthesis with specified frequency response.

A multi resolution noise filtering algorithm is proposed in: Ranganath S., "Image Filtering Using Multiresolution Representations", IEEE Trans. on Pattern Analysis and Machine Intelligence, vol. 13, no. 5, pp. 426-440, May 1991. According to the paradigm described in this paper, a sequence of low pass approximations of the original image at successively coarser resolution levels are computed, and adaptive noise suppression is achieved by linearly combining all levels at every pixel position, the weight coefficients being adapted to the local noise statistics at every pixel.

In Pattern Recognition Letters, vol. 12, no. 8 of August 1991 an article entitled 'Edge preserving artefact free smoothing with image pyramids' has been published. This article discloses a smoothing method in which smoothing is performed by assigning the local mean of non-overlapping pixel blocks of sizes either 8×8, 4×4, or 2×2 to all pixels of the block, depending on whether the block is homogeneous or not (assignment starting with the larger block sizes). Pixels which do not belong to a homogeneous block of any size are assigned a value which is a weighted average of the input pixel value and the 2×2 local mean. Assigning identical values to blocks of pixels inherently causes so called "block artefacts", a problem being recognised in the same reference.

In European Patent EP0574969 B1 (U.S. Pat. No. 5,461,655), a de-noising multiscale technique is proposed which comprises a decomposition step of the original image into a set of detail images at multiple resolution levels and a residual image, followed by a processing step and a reconstruction algorithm yielding the resulting image. The processing step herein is based on pixelwise attenuation of the detail image signal. A moving average of squared pixel values of each detail image in a N×N neighbourhood centered around each pixel of interest (i.e., a sum of the squared pixel values divided by $N^2$) is calculated as a local variance, and a histogram of the local variance is produced for each detail image. Next, a local variance corresponding to the peak in the histogram is determined as "noise variance", and the local variance corresponding to each pixel is compared with this "noise variance". When the local variance is comparable to or smaller than the noise variance, a portion of the band-limited image signal (the detail image signal) corresponding to the pixel is reduced.

US2002/071600 A1 discloses, in the context of multi-scale image decomposition, an adaptive filter, which performs a smoothing process along the orientation of edges detected in the image, with the purpose of suppressing noise without reducing edge contrast and consequently reducing the distortions in the vicinity of significant grey level transitions.

It is the object of the present invention to provide a method for reducing the noise level in a digital image, and more particularly in digital medical gray scale images. The presented invention is advantageous in that it provides a method for suppressing noise in a digital image without significantly reducing the relevant signals, so that the signal to noise level increases. At the same time, the method provides a method for reducing the noise level in a digital image without reducing edge contrast and consequently reducing the distortions in the vicinity of significant grey level transitions.

Moreover, the mentioned reduction of the noise level takes place in a digital image over a wide spatial frequency band, and not only to a specific frequency band. The present invention is further advantageous in that it provides a method for reducing the noise level in a digital image without having prior knowledge of the signal to noise ratio. A still further advantage of the present invention is that it combines edge preserving noise suppression with contrast enhancement so that excellent contrast can be achieved without boosting the inherent image noise to a disturbing level. The method is particularly efficient for reducing the noise level in digital images with essentially Poisson distributed noise, such as images obtained from digital radiography and computed tomography.

SUMMARY OF INVENTION

The present invention provides a method for enhancing the contrast-to-noise ratio (or suppressing noise) in an electronic representation of an original image represented by an array of pixel values by processing said image, said processing comprising the steps of decomposing said digital image into a set of detail images at multiple resolution levels and a residual image at a resolution level lower than said multiple resolution levels, processing said detail images, computing a processed image by applying a reconstruction algorithm to the residual image and the processed detail images, said reconstruction algorithm being such that if it were applied to the residual image and the detail images without processing, then said digital image or a close approximation thereof would be obtained, characterized in that said processing comprises the steps of calculating a local variance for at least one detail image pixel and enhancing/suppressing at least one detail image pixel as a function of said local variance value and said detail image pixel.

The invention differs from the state of the art as described in EP0574969 B1 (U.S. Pat. No. 5,461,655) in so far that the enhancing/suppressing depends—as claimed in our invention—on the calculation of a local variance and on the local detail image pixel value (or detail image pixel), as opposed to comparing local variance corresponding to each pixel with a global value over the entire detail image ("noise variance").

The above-mentioned aspects are realized by a method, computer program product, and computer readable medium as defined in the appending claims which define the invention. Specific and preferred embodiments of this invention are set out in the dependent claims.

In the context of the present invention specific terms are defined as follows:

Decomposing (decomposition of) a digital image: refers to a multi-scale (or multi-resolution) decomposition of an image which is a process that computes detail images of the image at multiple scales. A multi-scale decomposition mechanism generally involves filter banks for computing the detail images. Well-known techniques are for example: The Laplacian pyramid, the Burt pyramid, the Laplacian stack, the wavelet decomposition and QMF filter banks.

Approximation Image:

An approximation image is a grey value image that represents the original grey value image at the same or a larger scale, or at the same or a lower resolution. An approximation image at a specific scale is equivalent to the original grey value image in which all details at that scale have been omitted (Mallat S. G., "A Theory for Multiresolution Signal Decomposition: The Wavelet Representation", IEEE Trans. On Pattern Analysis and Machine Intelligence, vol. 11, no. 7, July 1989).

Detail Image:

A detail image is defined as the difference of information between an approximation image at a certain scale and an approximation image at a smaller scale.

Generally, $d_k(i,j)$ represents the detail image pixel value at position i,j in the detail image $d_k$ that is computed as a weighted sum of pixels in the approximation image at the same or smaller scale k, k-1, k-2, . . . :

$$d_k = g_l(ri, rj) - \sum_m \sum_n v_{m,n} g_l(ri + m, rj + n)$$

where with $l \in \{0, \ldots, k\}$ and r=subsampling factor (l–k)

Translation Difference Image:

The translation difference images at a scale l are a measurement of elementary contrast in each pixel of an approximation image at scale s. They can be computed by taking the difference of the approximation image at that scale and a translated version. The translation difference image at a scale l is thus defined as:

$$g_l(ri,rj) - g_l(ri+m,rj+n)$$

Other computations for elementary contrast are possible, e.g. the ratio of pixel with a neighbouring pixel can be used in case the processing steps are preceded by an exponential transform and followed by a log transform.

Center Difference Image:

A center difference image is computed by applying a combining operator (for example the summation) to translation difference images. The combining operator can be a linear or non-linear function of corresponding pixel values in the translation difference images.

Local Variance:

For each detail image pixel a local variance value will be calculated. E.g. A moving average of squared pixel values of each detail image in a N×N neighbourhood centered around each pixel of interest (i.e., a sum of the squared pixel values divided by $N^2$) is calculated as a local variance of the detail image.

Noise Reduction Operator:

A noise reduction operator generates pixel-wise modification of the detail image pixel values as an intermediate step to create a noise enhanced version of the grey value image after reconstruction. It can be implemented as a conversion function $f_k$ (e.g. look up table):

$$d_{k\ out}(i,j)=f_k(d_k(i,j)\text{var}_k(i,j))$$

This noise reduction operator is a function of the detail image and the local variance of the detail image. The pixel-wise modification can also be defined as a multiplicative factor $a_k(i,j)$:

$$d_{k\ out}(i,j)=a_k(i,j)d_k(i,j)$$

Iterative Method

The processing of the image could be done in an iterative way. First the local variance and detail image pixel values are used to calculate the noise reduction operator ($a_k(i,j)$):

$$d_{k,it}(i,j),\text{var}_{k,it}(i,j)=>a_{k,it}(i,j)$$

Next, detail image pixels are enhanced or suppressed by the noise reduction operator:

$$d_{k,it+1}(i,j)=a_{k,it}(i,j)d_{k,it}(i,j)$$

we can calculate a new local variance for these enhanced or suppressed detail image.

$$d_{k,it+1}=>\text{var}_{k,it+1}$$

The new local variance and the enhanced or suppressed detail image can then be used to enhance or suppress the enhanced or suppressed detail image again. This process could be repeated multiple times.

In order to calculate $\text{var}_{k,it+1}(i,j)$ one could also use Taylor expansions approximation for the moments of functions of random variables:

$$\text{var}_{k,it+1} \sim (a_{k,it}(i,j))^2\ \text{var}_{k,it}(i,j)$$

The present invention is generally implemented as a computer program product adapted to carry out the method of any of the claims when run on a computer and is stored on a computer readable medium. The methods of the present invention can be applied for enhancing the image quality of medical images such as mammographic images, images obtained by computed tomography etc.

Further advantages and embodiments of the present invention will become apparent from the following description and drawings.

DESCRIPTION OF EMBODIMENTS

Figure 1:
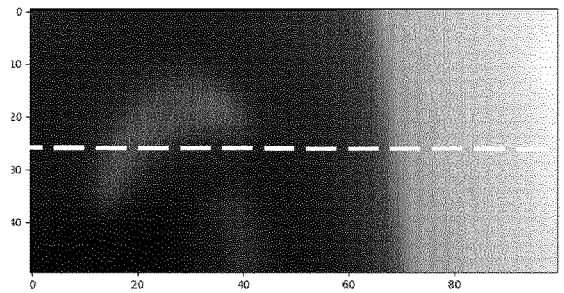
FIG. 1 is a representation of an original grayscale X-ray image (on the left), showing a distinct (almost vertically oriented) edge between a dense and a less dense area. The two dimensional graph on the right side of the image corresponds to the graph of the pixel values on row 25 (white dotted line) across the image.
Figure 1:
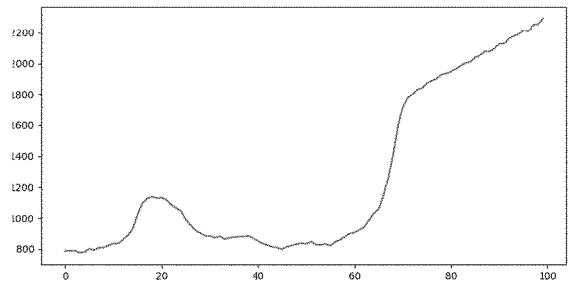

The noise reduction algorithm of the present invention is applicable to all multi-scale detail representation methods from which the original image can be computed by applying the inverse transformation. Noise reduction is equivalent to the enhancement of the signal-to-noise ratio in the image. Preferably the multi scale representation has a pyramidal structure such that the number of pixels in each detail image decreases at each coarser resolution level.

State-of-the-art multi-scale algorithms decompose an image into a multi-scale representation comprising detail images representing detail at multiple scales and a residual image. Some of the important multi-scale decompositions are the wavelet decomposition, the Laplacian-of-Gaussians (or LoG decomposition), the Difference-of-Gaussians (or DoG) decomposition and the Burt pyramid.

The wavelet decomposition is computed by applying a cascade of high-pass and low-pass filters followed by a subsampling step. The high-pass filter extracts the detail information out of an approximation image at a specific scale. In the Burt pyramid decomposition, the detail information is extracted out of an approximation image at scale k by subtracting the upsampled version of the approximation image at scale k+1.

In a state of the art methods as the one disclosed in EP 527 525 a contrast enhanced version of the image is created by conversion of the pixel values in the detail images followed by multi-scale reconstruction. All above implementations of multiscale decomposition have a common property. Each pixel value in the detail images can be computed out of an approximation image by combining the pixel values in a moving neighborhood.

In the above cases the combining function is a weighted sum. For the wavelet decomposition the pixel values in the detail image at scale k are computed as:

$$d_{k+1}=\downarrow(h_d*g_k)$$

$$g_{k+1}=\downarrow(l_d*g_k)$$

with $h_d$ a high-pass filter, $l_d$ a low-pass filter, *the convolution operator and ↓ the subsampling operator (i.e. leaving out every second row and column).

For the wavelet reconstruction the noise-reduced approximation image at scale k is computed as:

$$h_k=l_r*(\uparrow h_{k+1})+h_r*(\uparrow f_k(d_k(i,j),\text{var}_k(i,j)))$$

with $h_r$ a high-pass filter, $l_r$ a low-pass filter and T the upsampling operator (i.e. inserting pixels with value 0 in between any two rows and columns).

For the Burt decomposition the pixel values in the detail image at scale k are computed as:

$$d_k=g_k-4g*(\uparrow g_{k+1})$$

or $$d_k=g_k-4g*(\uparrow(\downarrow(g*g_k)))$$

or $$d_k=(1-4g*(\uparrow(\downarrow g)))*g_k$$

with g a Gaussian low-pass filter and 1 the identity operator.

For the Burt reconstruction the noise reduced approximation image at scale k is computed as:

$$h_k = 4g * (\uparrow h_{k+1}) + f_k(d_k(i,j), \text{var}_k(i,j))$$

with $f_k(d_k(i,j), \text{var}_k(i,j))$ the noise reduction operator.

The multi-scale detail pixel values as weighted sums.

Suppose that in the Burt multi-scale decomposition a 5×5 Gaussian filter is used with coefficients $w_{k,l}$ with $k = -2, \ldots, 2$ and $l = -2, \ldots, 2$ the subsampling operator removes every second row and column and the upsampling operator inserts pixels with value 0 in between any two rows and columns.

The pixel at position i,j in the approximation image $g_{k+1}$ is computed as:

$$g_{k+1}(i, j) = \sum_{s=-2}^{2} \sum_{t=-2}^{2} w_{s,t} g_k(2i+s, 2j+t)$$

The pixel at position i,j in the upsampled image $u_k$ is computed as:

$$u_k(i, j) = \begin{cases} \sum_{s=-2}^{2} \sum_{t=-2}^{2} w_{s,t} g_k(i+s, j+t), & \text{if } i \text{ and } j \text{ are even} \\ 0 & \text{if } i \text{ and } j \text{ are note even} \end{cases}$$

The pixel at position i,j in the upsampled, smoothed image $gu_k$ is computed as:

$$gu_k(i, j) = \begin{cases} \sum_{m=\{-2,0,2\}} \sum_{n=\{-2,0,2\}} w_{m,n} \sum_{s=-2}^{2} \sum_{t=-2}^{2} w_{s,t} g_k(i+s+m, j+t+n), & \text{if } i \text{ and } j \text{ are even} \\ \sum_{m=\{-1,1\}} \sum_{n=\{-2,0,2\}} w_{m,n} \sum_{s=-2}^{2} \sum_{t=-2}^{2} w_{s,t} g_k(i+s+m, j+t+n), & \text{if } i \text{ is odd and } j \text{ is even} \\ \sum_{m=\{-2,0,2\}} \sum_{n=\{-1,1\}} w_{m,n} \sum_{s=-2}^{2} \sum_{t=-2}^{2} w_{s,t} g_k(i+s+m, j+t+n), & \text{if } i \text{ is even and } j \text{ is odd} \\ \sum_{m=\{-1,1\}} \sum_{n=\{-1,1\}} w_{m,n} \sum_{s=-2}^{2} \sum_{t=-2}^{2} w_{s,t} g_k(i+s+m, j+t+n), & \text{if } i \text{ and } j \text{ are odd} \end{cases}$$

Finally, the pixel at position i,j in the detail image $d_k$ is computed as:

$$d_k(i, j) = \begin{cases} g_k(i,j) - 4 \sum_{m=\{-2,0,2\}} \sum_{n=\{-2,0,2\}} w_{m,n} \sum_{s=-2}^{2} \sum_{t=-2}^{2} w_{s,t} g_k(i+s+m, j+t+n), & \text{if } i \text{ and } j \text{ are even} \\ g_k(i,j) - 4 \sum_{m=\{-1,1\}} \sum_{n=\{-2,0,2\}} w_{m,n} \sum_{s=-2}^{2} \sum_{t=-2}^{2} w_{s,t} g_k(i+s+m, j+t+n), & \text{if } i \text{ is odd and } j \text{ is even} \\ g_k(i,j) - 4 \sum_{m=\{-2,0,2\}} \sum_{n=\{-1,1\}} w_{m,n} \sum_{s=-2}^{2} \sum_{t=-2}^{2} w_{s,t} g_k(i+s+m, j+t+n), & \text{if } i \text{ is even and } j \text{ is odd} \\ g_k(i,j) - 4 \sum_{m=\{-1,1\}} \sum_{n=\{-1,1\}} w_{m,n} \sum_{s=-2}^{2} \sum_{t=-2}^{2} w_{s,t} g_k(i+s+m, j+t+n), & \text{if } i \text{ and } j \text{ are odd} \end{cases}$$

Generally, the pixel at position i,j in the detail image $d_k$ can be computed as a weighted sum of pixels in the approximation image at the same or smaller scale k, k−1, k−2, . . . :

$$d_k(i, j) = g_l(ri, rj) - \sum_m \sum_n v_{m,n} g_l(ri+m, rj+n)$$

with $l \in \{0, \ldots, k\}$ and $r = \text{subsampling\_jactor}^{(l-k)}$

Because, $$\sum_m \sum_n v_{m,n} = 1$$

the pixel at position i,j in the detail image $d_k$ can be computed as:

$$d_k(i, j) = g_l(ri, rj) - \sum_m \sum_n v_{m,n} g_l(ri+m, rj+n)$$

$$d_k(i, j) = \sum_m \sum_n v_{m,n} g_l(ri, rj) - \sum_m \sum_n v_{m,n} g_l(ri+m, rj+n)$$

$$d_k(i, j) = c_k(i, j) = \sum_m \sum_n v_{m,n} (g_l(ri, rj) - g_l(ri+m, rj+n))$$

The term $(g_l(ri,rj) - g_l(ri+m,rj+n))$ is called the translation difference.

It expresses the difference in pixel value between a central pixel and a neighboring pixel in an approximation image. It is a measure of local contrast. The weighted sum of the translation differences is called a centre difference $c_k(i,j)$.

The weights can be chosen such that the center difference images are identical to the multi-scale detail images or that they are a close approximation of the multi-scale detail images. In a similar way as disclosed higher, it can be proven that the detail images in other multi-scale decomposition methods can also be represented as a combination of translation difference images.

According to a specific embodiment of this method, the center difference image may be computed by applying a linear function as a combining operator to the translation difference images. An example of such a linear function is $$\sum_m \sum_n v_{m,n} (g_l(ri, rj) - g_l(ri+m, rj+n))$$

such that this equation equals the detail image itself on condition that:

$$\sum_m \sum_n v_{m,n} = 1$$

In one embodiment, local variance of detail image value is the weighted average within a neighbourhood of the squared difference between the detail image and the weighted average in a neighbourhood of the detail image:

$$\text{var}_k(i, j) = \sum_m \sum_n v_{m,n} \left( d_k(ri + m, rj + n) - \sum_m \sum_n v_{m,n} d_k(ri + m, rj + n) \right)^2$$

This can also be written as the (weighted) average of the squared value of all detail image pixels within an N×N neighbourhood minus the (weighted) average of the detail image in the neighbourhood.

$$\text{var}_k(i, j) = \sum_m \sum_n v_{m,n} d_k(ri + m, rj + n)^2 - \left( \sum_m \sum_n v_{m,n} d_k(ri + m, rj + n) \right)^2$$

Since the (weighted) average of the detail image in the neighbourhood can be approximated by zero, we can calculate an approximation of the local variance of the detail image by a moving average of squared pixel values of each detail image in a N×N neighbourhood centered around each pixel of interest (i.e., a sum of the squared pixel values divided by $N^2$ $$\text{var}_k(i, j) = \sum_m \sum_n v_{m,n} d_k(ri + m, rj + n)^2$$

As an example of an N×N neighbourhood, a 3×3 neighbourhood has to be understood as a surface of 3×3 image pixels around a central pixel, such that m and n are both {−1, 0, 1} and $$v_{m,n} = \frac{1}{9}$$

for mathematical notations above. $v_{m,n}$ can also have Gaussian weights.

In another embodiment, the local variance of the detail image is not computed with an average operator, but as a predetermined percentile of the squared value of all detail image pixels within a neighbourhood.

As example, this predetermined percentile of the squared value of all detail image pixels within a neighbourhood may be implemented as taking the maximum or as the 100% percentile):

$$\text{var}_k(i, j) = \max_{m,n} d_k(ri + m, rj + n)^2$$

Instead of maximum (=100% percentile), another percentile value can be taken: median (50%) or 95%-percentile.

In one embodiment: the local variance is the variance of the translation difference.

In yet another embodiment, the local variance of the translation difference is computed as the weighted average of the squared difference of the translation difference image and the detail image in an N×N neighbourhood centered around each pixel of interest;

$$\text{var}_k(i, j) = \sum_m \sum_n v_{m,n} (g_l(ri, rj) - g_l(ri + m, rj + n) - \\ \sum_m \sum_n v_{m,n} (g_l(ri, rj) - g_l(ri + m, rj + n)) \Big)^2 \text{ or}$$

$$\text{var}_k(i, j) = \sum_m \sum_n v_{m,n} (g_l(ri, rj) - g_l(ri + m, rj + n) - d_k)^2$$

or in case that $$\sum_m \sum_n v_{m,n} = 1 \text{ then}$$

$$\text{var}_k(i, j) = -d_k^2 + \sum_m \sum_n v_{m,n} (g_l(ri, rj) - g_l(ri + m, rj + n))^2$$

For faster computation, this formula may also be approximated. As an example we could omit $d_k^2$:

$$\text{var}_k(i, j) = \sum_m \sum_n v_{m,n} (g_l(ri, rj) - g_l(ri + m, rj + n))^2$$

This value of the local variance could be smaller than zero. This could be solved by taking the absolute value or by setting all values smaller than zero to zero.

Noise Reduction

The resulting local variance and the value of the detail image pixel are used to enhance or suppress the detail image pixel in order to obtain a processed detail image in such a way, that after reconstruction noise is suppressed but edges are preserved.

This could be done with a function $f_k$ that is a function of the local variance of the detail image and the detail image pixel value itself:

$$d_{k\ out}(i,j) = f_k(d_k(i,j), \text{var}_k(i,j))$$

$d_{k\ out}(i,j)$ is the resulting detail image.

In one embodiment, $f_k$ is a non-linear function of the local variance of detail image and the detail image pixel.

Noise reduction could also be applied with a multiplicative noise reduction factor $a_k(i,j)$:

$$d_{k\ out}(i,j) = a_k(i,j) d_k(i,j)$$

Local values of $a_k(i,j)$ larger than unity result in enhancing the detail image pixel (i,j), values smaller than unity result in attenuating the detail image pixel. $a_k(i,j)$ is a function of the local variance of the detail image and the detail image pixel value itself:

$$a_k(i,j) = f(d_k(i,j), \text{var}_k(i,j))$$

Figure 2:
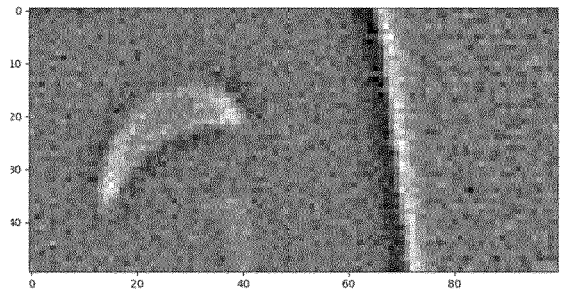
FIG. 2 on the left represents a first layer (detail image) of a Laplacian pyramid. The solid graph represents the detail image pixel values on the same horizontal line (on row 25) of the depicted detail image. The dotted line represents the calculated variances at of the same row of pixels in the detail image. In the invention, both values (the absolute value of the pixel value of the detail image and the calculated variance at the pixel location) are locally compared to each other to determine how the pixel value in the detail image is to be enhanced or suppressed.
Figure 2:
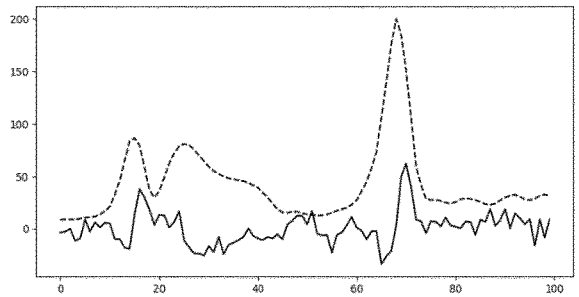
Figure 3:
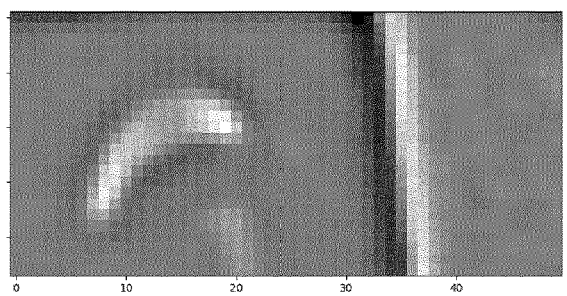
FIG. 3 and FIG. 4, represent further layers (layer 2 and 3) of the same Laplacian pyramid. The images on the left thus represent the further detail images that are calculated at further lower spatial resolutions. The corresponding graphs on the right hand side have the same meanings as in FIG. 2.
Figure 3:
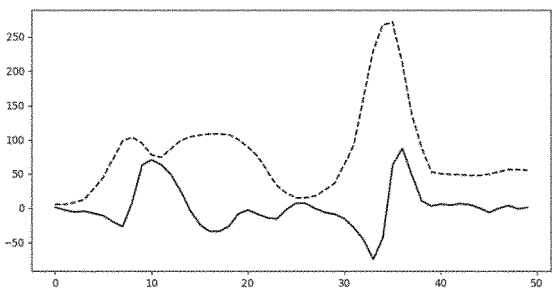
Figure 4:
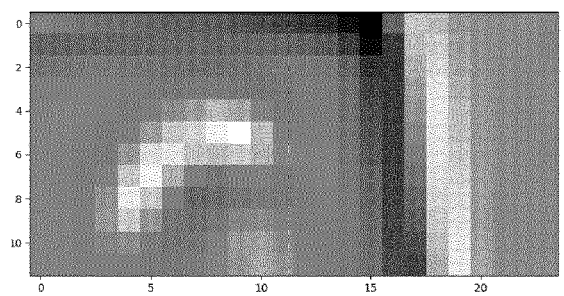
Figure 4:
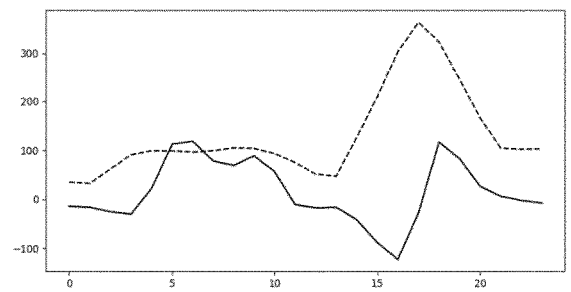

Typically, at locations in the detail image which represent edges (for instance refer to FIG. 2) the ratio of the square root of the local variance and the absolute value of the detail image pixel is larger compared to this ratio at locations representing regular data points comprising noise. If enhancement of this edge is wanted while reducing the noise in the regular data points, one could apply relatively higher amplification to the detail pixels with a higher ratio and relatively lower amplification to the detail pixels with a lower ratio. In order to achieve this effect, in one embodiment, the noise reduction factor $a_k(i,j)$ for each pixel can be defined as follows:

$$a_k(i, j) = \frac{\sqrt{\mathrm{var}_k(i, j)}}{|d_k(i, j)| n_s}$$

wherein $|d_k(i,j)|$ is the absolute value of the detail image $d_k(i,j)$, $\sqrt{\mathrm{var}_k(i,j)}$ is the local variance for each pixel of interest and $n_s$ is a parameter to control the noise suppression level.

$n_s$ is chosen for each scale in such a way that $\sqrt{\mathrm{var}_k(i,j)}$ and $|d_k(i,j)|$ have a similar order of magnitude. A higher value of $n_s$ results in more attenuation, a lower value in more amplification. For finer scales, with typically more noise, a larger noise suppression parameter is chosen, for coarser scales a smaller noise suppression is chosen. As an example, the noise suppression parameter $n_s$=2.4 at scale 0, whereas $n_s$=1 at scale 1 results in natural looking noise suppression in the reconstructed image. The final detail image will be shaped as the $\sqrt{\mathrm{var}_k(i,j)}/n_s$ multiplied with the sign of $d_k(i,j)$:

$$d_{k\,out}(i, j) = \frac{\sqrt{\mathrm{var}_k(i, j)}}{|d_k(i, j)| n_s} d_k(i, j) \text{ or,}$$

$$d_{k\,out}(i, j) = \frac{\sqrt{\mathrm{var}_k(i, j)}}{n_s} \mathrm{sign}(d_k(i, j))$$

In another embodiment, $a_k$ may be limited to a band of values defined between an upper and lower bound. Typical values for lower and upper bound are found to give good results when they are respectively 0.5 and 1. A smaller value of the lower bound (e.g. zero) will result in more attenuation of noise, while larger values of the upper bound (e.g. 2) will result in increased enhancement of the edges.

In another embodiment, $n_s$, as well as the lower and upper bound may be calculated based on particular parameters which can be derived from the image data (or detail image data). For instance, histogram values of $d_k(i,j)$ and $\mathrm{var}_k(i,j)$ or a combination of such parameters may be applied in a mathematical function to derive the parameters above ($n_s$, and lower and upper bound).

In another embodiment: another non-linear function may be used for $a_k(i,j)$, such as for instance:

$$a_k(i, j) = Enh \cdot \tanh\left(\frac{\sqrt{\mathrm{var}_k(i, j)}}{|d_k(i, j)| n_s}\right)$$

Since tanh( ) of a positive value yields values between 0 and 1, an additional multiplicative enhancement parameter (Enh) is added so also values above 1, and thus enhancement, can be obtained. A typical value could be Enh=1.2.

Subsequently, the reconstruction algorithm is applied to the enhanced or suppressed detail images $d_{k\,out}$. It should be noted that some pixels at some scales might not be enhanced or suppressed at all.

In addition, other enhancements may be applied to $d_k$ prior or after the application of the noise reduction factor $a_k(i,j)$.

The above-mentioned aspects are realized by a method, an apparatus, computer program product, and computer readable medium as defined in the appending claims which define the invention. Specific and preferred embodiments of this invention are set out in the dependent claims.

The present invention further discloses an apparatus for enhancing contrast to noise ratio in an electronic representation of an image comprising:
  means for decomposing said electronic representation into a set of detail images at multiple resolution levels and a residual image at a resolution level lower than the minimum of said multiple resolution levels,
  means for processing said detail images,
  means for computing a processed image by applying a reconstruction algorithm to the residual image and the processed detail images, said reconstruction algorithm being such that if it were applied to the residual image and the detail images without processing, then said electronic image or a close approximation thereof would be obtained, characterised in that said apparatus comprises
  means for storing said detail images, and wherein said means for processing said detail images, comprises:
  means for calculating a local variance value for at least one detail image pixel within a neighbourhood of said detail image pixel,
  means for enhancing or suppressing at least one detail image pixel as a function of said local variance value and said detail image pixel value.

The invention claimed is:

1. A computer-implemented method for enhancing contrast to noise ratio in an electronic representation of an original image represented by an array of pixel values by processing said image, said processing comprising the steps of:
  a) decomposing said digital image into a set of detail images at multiple resolution levels and a residual image at a resolution level lower than said multiple resolution levels,
  b) processing the detail images,
  c) computing a processed image by applying a reconstruction algorithm to the residual image and the processed detail images, said reconstruction algorithm being such that if it were applied to the residual image and the detail images without processing, then said digital image or a close approximation thereof would be obtained,
  d) calculating a local variance value for at least one detail image pixel within a neighborhood of said detail image pixel;
  e) enhancing or suppressing at least one detail image pixel as a function of said local variance value and said detail image pixel value,
  characterized in that:
    said local variance value is a calculated local variance of translation differences of said detail image pixel, and said translation differences being a measurement of elementary contrast of said detail image pixel of an approximation image.

2. The computer-implemented method of claim 1, wherein said local variance value is computed as the weighted average within a neighborhood of the squared differences between translation difference image pixel values and the detail image pixel values, said translation differences being a measurement of elementary contrast of said detail image pixel of an approximation image.

3. The computer-implemented method of claim 1, wherein said local variance value is the local variance of the translation differences of a detail image pixel, wherein a translation difference is a measurement of elementary contrast in a pixel of an image approximating the original image at a resolution level.

4. The computer-implemented method of claim 1, wherein said local variance value is computed as the weighted average within a neighborhood of the squared differences between translation difference image pixel values and the detail image pixel values, wherein a translation difference is a measurement of elementary contrast in a pixel of an image approximating the original image at a resolution level.

5. The computer-implemented method of claim 1, wherein said local variance value is computed as the weighted average within a neighborhood of the squared differences between translation difference image pixel values and the detail image pixel value, wherein said detail image pixel value is computed as the weighted average within a neighborhood of the translation difference image pixel values, wherein a translation difference is a measurement of elementary contrast in a pixel of an image approximating the original image at a resolution level.

6. The computer-implemented method of claim 5, wherein said enhancing or suppressing is defined as a multiplicative factor for each detail image pixel:

$$d_{k\ out}(i,j) = a_k(i,j) d_k(i,j)$$

wherein $d_{k\ out}(i,j)$ is the processed detail image pixel value, $d_k(i,j)$ is the detail image pixel value and $a_k(i,j)$ is the multiplicative factor which is a function of said local variance value and said detail image pixel value and wherein said multiplicative factor for each detail image pixel is defined as:

$$a_k(i,j) = \frac{\sqrt{\mathrm{var}_k(i,j)}}{|d_k(i,j)| n_s}$$

wherein $|d_k(i,j)|$ is the absolute value of the detail image pixel value $d_k(i,j)$, $n_s$ is a parameter to control the noise suppression, and $\mathrm{var}_k(i,j)$ is the local variance value.

7. The computer-implemented method of claim 6, wherein said multiplicative factor is limited to a band of values defined between an upper and lower limit.

8. The computer-implemented method of claim 6, wherein said multiplicative factor for each detail image pixel is defined as:

$$a_k(i,j) = Enh\ \tanh \frac{\sqrt{\mathrm{var}_k(i,j)}}{|d_k(i,j)| n_s}$$

wherein $|d_k(i,j)|$ is the absolute value of the detail image pixel value $d_k(i,j)$, $n_s$ is a parameter to control the noise suppression, Enh is a parameter to control enhancement, and $\mathrm{var}_k(i,j)$ is the local variance value.

9. The computer-implemented method of claim 1, wherein processing detail images is repeated at least one time for already processed detail image pixels.

10. An apparatus for enhancing contrast to noise ratio in an electronic representation of an image comprising:
processing circuitry configured to:
a) decompose said electronic representation into a set of detail images at multiple resolution levels and a residual image at a resolution level lower than the minimum of said multiple resolution levels,
b) process said detail images,
c) compute a processed image by applying a reconstruction algorithm to the residual image and the processed detail images, said reconstruction algorithm being such that if it were applied to the residual image and the detail images without processing, then said electronic image or a close approximation thereof would be obtained,
d) store said detail images, and wherein said processing circuitry configured to process said detail images is further configured to:
e) calculate a local variance value for at least one detail image pixel within a neighborhood of said detail image pixel,
f) enhance or suppress at least one detail image pixel as a function of said local variance value and said detail image pixel value,
characterized in that:
said local variance value is a calculated local variance of translation differences of said detail image pixel, and said translation differences being a measurement of elementary contrast of said detail image pixel of an approximation image.

11. A computer program comprising instructions embodied on a non-transitory computer readable medium which, when the program is executed by a computer, cause the computer to carry out the steps of the method of claim 1.

12. A non-transitory computer-readable medium comprising instructions which, when executed by a computer, cause the computer to carry out the steps of the method of claim 1.

* * * * *